United States Patent [19]

O'Connor

[11] Patent Number: 5,790,489
[45] Date of Patent: Aug. 4, 1998

[54] SMART COMPACT DISK INCLUDING A PROCESSOR AND A TRANSMISSION ELEMENT

[75] Inventor: Clint H. O'Connor, Austin, Tex.

[73] Assignee: Dell USA, L.P., Round Rock, Tex.

[21] Appl. No.: 784,570

[22] Filed: Jan. 21, 1997

[51] Int. Cl.$^6$ .................................................. G11B 7/00
[52] U.S. Cl. ........................... 369/52; 369/275.5; 360/60
[58] Field of Search ...................... 369/58, 54, 52, 369/275.1–275.5, 14; 360/135, 60

[56] References Cited

U.S. PATENT DOCUMENTS

| | | | |
|---|---|---|---|
| 4,868,373 | 9/1989 | Ophei et al. | 369/14 |
| 5,065,388 | 11/1991 | Roth et al. | 369/47 |
| 5,124,966 | 6/1992 | Roth et al. | 369/47 |
| 5,253,234 | 10/1993 | Ogawa et al. | 369/36 |
| 5,258,974 | 11/1993 | Ishimura et al. | 369/275.1 |
| 5,282,187 | 1/1994 | Lee | 369/14 |
| 5,289,439 | 2/1994 | Koulopoulos et al. | 369/32 |
| 5,291,462 | 3/1994 | Richards | 369/13 |
| 5,338,923 | 8/1994 | Grieu | 235/492 |
| 5,341,229 | 8/1994 | Rowan | 359/10 |
| 5,383,078 | 1/1995 | Kato et al. | 360/135 |
| 5,465,381 | 11/1995 | Schmidt et al. | 360/135 |
| 5,652,838 | 7/1997 | Lovett et al. | 360/135 |

*Primary Examiner*—Nabil Hindi
*Attorney, Agent, or Firm*—Skjerven, Morrill, MacPherson, Franklin & Friel, LLP

[57] ABSTRACT

A compact disk includes a processor and a transmission element under control of the processor. A laser in a compact disk read head illuminates a photosensitive array disposed on the compact disk to generate a current in a charging array. The current generated in charging array is supplied to a storage element. The storage element supplies the processor with power. The processor controls a transmission element electrically coupled to the processor and optically coupled to the compact disk reader to impart an informational signal to the compact disk reader such as a cryptographic key to control utilization of the contents of the CD. The CD can be written to by the CD controller by having the CD read circuit control the light provided to the photosensitive array to impart an information signal to the photosensitive sensitive array. A circuit is coupled to the light sensitive array to time the on and off state of the current supplied to the light sensitive array and to thereby detect the informational signal from the compact disk reader circuit.

28 Claims, 3 Drawing Sheets

5,790,489

SMART COMPACT DISK INCLUDING A PROCESSOR AND A TRANSMISSION ELEMENT

BACKGROUND OF THE INVENTION

1. Field of the Invention

This invention relates to the field of compact disks. More specifically, this invention relates to providing a smart compact disk.

2. Description of the Related Art

Compact disk (CD) media is becoming the software distribution medium of choice for software developers and hardware manufacturers alike. An accompanying issue is the security of the data on the CD-ROM and protection schemes to prevent copying. The issue of copying the CD-ROM itself has not been a serious one up until present due to the cost of the writers ($6000 and up).

As the cost of CD-ROM writers continues to fall, copying will become more prevalent. Existing schemes to prevent illegal copying include encrypting the data and providing the decryption key upon payment for the software on the CD. One flaw in that approach is that a mix of CDs with different encryption keys must be produced to reduce the piracy that results when one person obtains a legitimate key and then passes the key on to others who use the key to illegally obtain software.

Write-once CDs also provide a means of secure software distribution. The contents of the CD are encrypted by means of a secure algorithm and an accessible decryption program is provided on the CD. However, this is not a practical method for large software vendors and this method still does not result in a secure means of distribution as the software can be distributed after it is decrypted. Additionally, this approach using write-once CDs provides no protection for music CDs.

What is needed is a more reliable way to secure the contents of the CD against piracy, preferably in a way that would also provide protection to music CDs. It would also be desirable to provide for access count-limited or time-limited use of the CD.

SUMMARY OF THE INVENTION

In accordance with the present invention, a method is provided in which a compact disk includes a processor and a transmission element under control of the processor. A laser in a compact disk read head illuminates a photosensitive charging array disposed on the compact disk to generate a current in the charging array. The current generated in the charging array is supplied to a storage element. The storage element supplies the processor with power. The processor controls the transmission element which is electrically coupled to the processor and optically coupled to the compact disk reader to impart an informational signal to the compact disk reader. The informational signal can be a cryptographic key to allow utilization of the contents of the CD ROM. Thus, the invention provides a more reliable way to secure the contents of the CD against piracy in a manner which also provides protection to music CDs. Further, the method of the invention can be utilized to provide for access count-limited or time-limited use of the CD.

In one embodiment, the apparatus of the invention provides a compact disk which includes an optically readable data area and a processor disposed on the compact disk. A charging array is disposed radially around the compact disk. A storage array is coupled to the charging array and stores charge received from the charging array. The storage array is coupled to and provides power to the processor. A transmission element is disposed on the compact disk, and coupled to the processor. The transmission element controllably reflects light. The transmission element is controllably coupled to the processor to impart an informational signal to an optical head.

In another embodiment, the processor is powered from a battery, preferably a thin film battery, so that the charging array is not needed. The battery and processor could be located in the data track or in the hub area outside of the data track. The transmission element and the light sensor are located in a position in the hub or data track which is accessible by the optical head.

In still another embodiment, the CD receives information from the CD reader to further enhance the capabilities of the smart CD. In such an embodiment, the compact disk read circuit controls the generation of light provided to a photosensor (which may be the charging array) to impart an information signal to the photosensor, which in turn is provided to the processor. Thus, such information as the date can be supplied to the smart CD to provide for date limited use of the CD.

BRIEF DESCRIPTION OF THE DRAWINGS

The present invention may be better understood, and its numerous objects, features, and advantages made apparent to those skilled in the art by referencing the accompanying drawings, wherein the use of the same reference number indicates the same element is being referenced.

The features of the invention believed to be novel are specifically set forth in the appended claims. However, the invention itself, both as to its structure and method of operation, may best be understood by referring to the following description and accompanying drawings.

DESCRIPTION OF THE PREFERRED EMBODIMENT(S)

Figure 1:
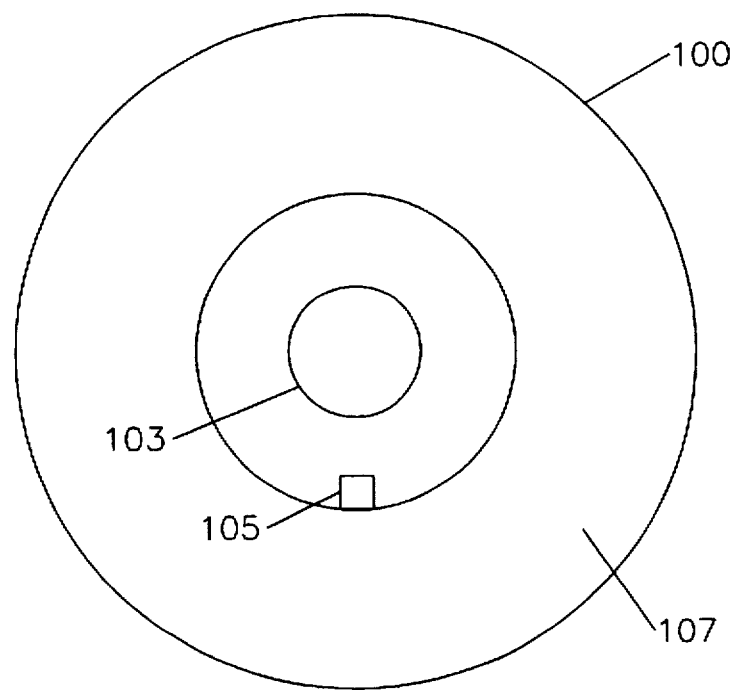
FIG. 1 shows a top view of a CD including a processor.
Figure 2:
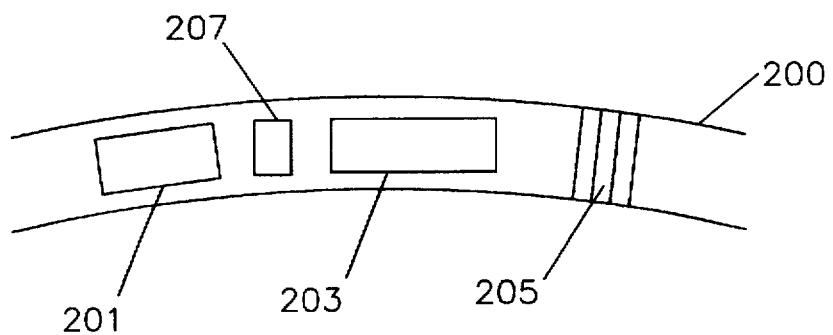
FIG. 2 shows the apparatus of the present invention arrayed along a portion of the CD track.

Referring to FIG. 1, CD 100 includes hub 103, data area 107 and processor 105. The processor may be a microprocessor with minimum capabilities to minimize power requirements. In addition to the normal data area 107, the hub may be modified to include an additional apparatus track. Referring to FIG. 2, apparatus track 200 includes processor 201, a photosensitive charging array 203, charge storage element 207, and a transmission element 205. Transmission element 205 could be a light emitting diode (LED), a laser diode or a liquid crystal display (LCD) reflector. It is preferable that the apparatus track 200 be placed onto the hub area 103 of CD 100 so as to not adversely affect the amount of data that can be provided on the CD. However, the portion of the hub area utilized for the apparatus track must be readable by the hardware in a CD drive. Depending on the mechanical limitations of the drive, i.e., whether the laser beam can be directed to the apparatus track on the hub and whether the sensor can receive reflected light from the apparatus track on the hub, it may be necessary to use some of the data area for the apparatus track.

In one embodiment of the invention, a capacitor is used as the storage element and an LCD reflector is used as the transmission element. In other embodiments of the invention, as discussed further herein, a thin-film battery and/or an EEPROM element for non-volatile memory storage are included on the CD.

The method of manufacturing the CD differs in that a recess for the apparatus must be provided. The apparatus, including the processor, charging array, charge storage element, and a transmission element, may be distributed radially around the CD, preferably either in the innermost tracks or the outermost tracks. Thin film materials are required for this construction.

The invention preferably utilizes a standard CD-ROM drive or a modified drive that can also read standard CDs. Slight modifications to a standard CD-ROM drive can enhance the utility of this invention. Note that the invention can also be applied to other types of optical disks as well as CD-ROMs, many of which have write capability.

Figure 3:
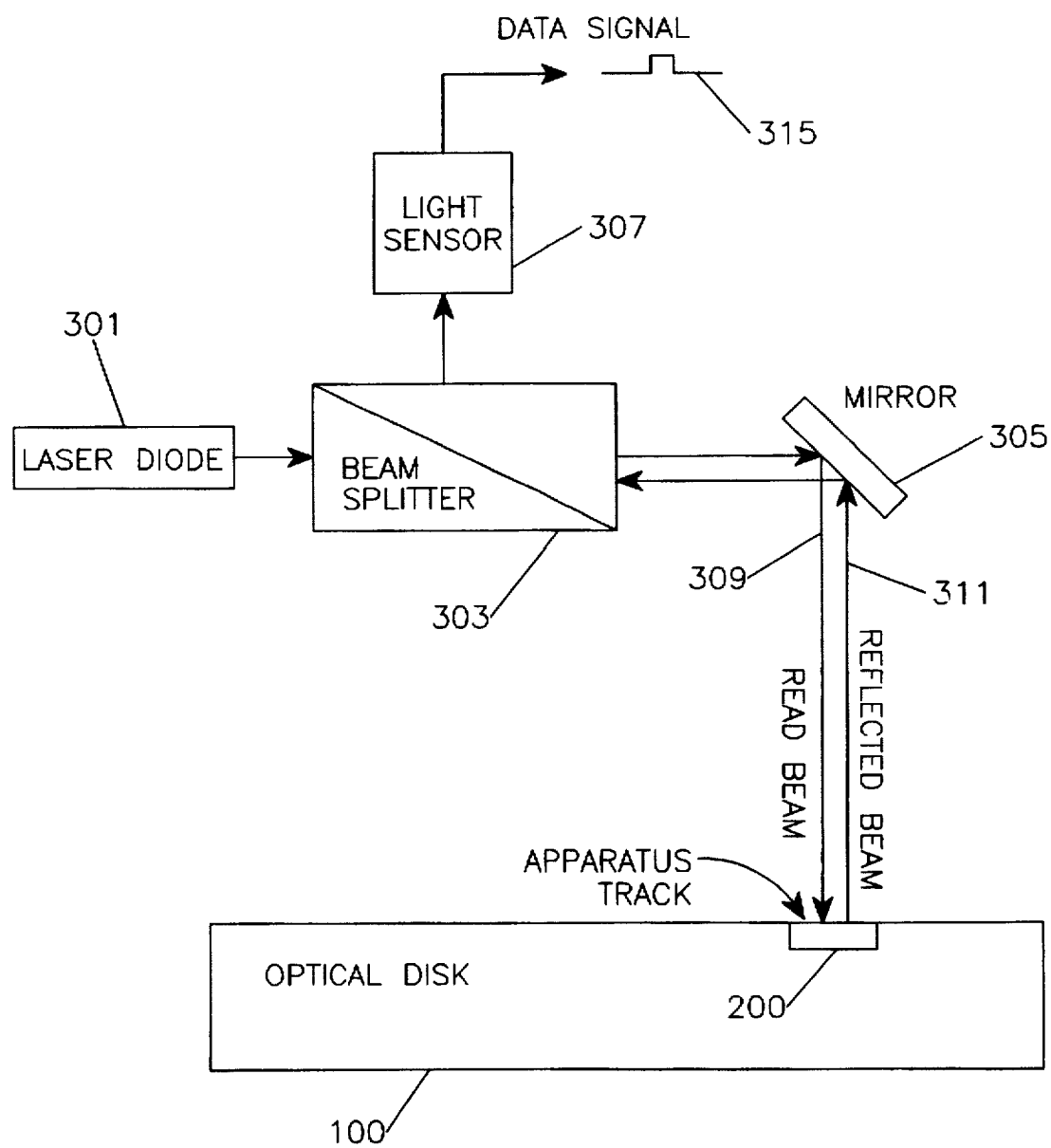
FIG. 3 shows a side view of the CD and the read head.

Referring now to FIG. 3, a CD 100 with apparatus track 200 is shown with read head 300. Read head 300 includes laser diode 301, beam splitter 303, mirror 305 and light sensor 307. Laser diode 301 emits a beam which passes through beam splitter 303 and is reflected off of mirror 305 towards the surface of CD 100. The read beam 309 may be used to charge the charging array or may be reflected off of the LCD background as reflected beam 311. Reflected beam 311 is then reflected by mirror 305 through beam splitter 303 to light sensor 307 which extracts the data signal 315 from the reflected beam. When an LED or laser diode is utilized as transmission element 205, the light sensor 307 sees the light from the transmission element rather than the reflected beam.

The present invention works as follows. At the beginning of an access to the CD, the photosensitive charging array 203 crosses under the laser beam 309 to begin the cycle. The energy delivered into the charging array accomplishes two functions. First, the laser beam 309 delivers energy to the charging array which charges storage element 207. In one exemplary embodiment, the storage element is a capacitor. The capacitor supplies energy to the processor and the LCD reflector or alternatively an LED/laser diode. The size of the capacitive storage element will depend upon the power requirements of the system and the energy in laser beam 309. For example, the use of a more complex processor, the use of more memory in the apparatus track, or a larger number of LCD elements could all lead to a bigger capacitive storage requirement.

In addition to providing power, the energy delivered into the charging array is used to mark the position of the read head. The start of the charging current marks the position of the read head to microprocessor 201 once the microprocessor has sufficient power. The distance from the beginning of the charging array to the beginning of the transmission array 205 will be fixed by design and manufacturing tolerances. The microprocessor 201 can use the physical length of the charging array, which is known at the time of manufacture, and the time elapsed while a charging current is being detected in the charging array, to derive the velocity of the CD and thereby compute the estimated time when the transmission element will pass under the read head 300, thereby conserving power by enabling the transmission element only when needed.

In one exemplary embodiment, the read laser power is 500 mW. Assuming some losses due to such factors as transmission efficiency and reflectivity, on the order of 20%, 400 mW impinges on the CD and the charging array. Given an energy conversion efficiency of 10%, typical of e.g., a high efficiency solar cell, the resulting power pumped into the charging array is 40 mW. A typical 6805 microcontroller (and more efficient microcontrollers are available) consumes about 5 mA operating current. At 3.3 V, this is 16 mW. Thus, a pass over the charging array would result in about 3 seconds of operating time for each second of charging. It is preferable that one pass over the charging array pump enough charge into the capacitor to start the microprocessor. After the processor wakes up, it can check to see if there is enough charge to operate. If not, it can go into a very low power mode and wait on the next pass and repeat the process. A short charging array can be utilized resulting in the need for multiple passes. Alternatively, a longer charging array can reduce the required number of charging passes. The number of revolutions of the CD that may be required to reach a sufficient charge for operation of the processor and the transmission element also depends upon materials used and energy transfer efficiencies.

In one embodiment, the microprocessor needs approximately 100 ms to start the clock and then approximately 1 ms to prepare for the write mode. 1–20 ms are required to write to the transmission array while it is passing under the CD read head. The processor may need to be powered up for only a maximum of 250 ms. On successive passes, the microprocessor does not need the 100 ms startup time and may need less than 20–50 ms to accomplish its task. The time will depend on the details of the processor, such as speed, bit width, and instruction set.

It may be necessary to modify the CD reader firmware so that a sector or other tracking error will not be generated when the read head encounters the charging array or transmission element in the recessed track. It is also possible that the driver software can reject particular errors when accessing this location of the CD.

Once sufficient energy has been stored, the processor can initialize from an inactive state. The processor can then use the LCD reflector as an output medium to the CD controller. The rotational speed of the CD drive can be determined due to the constant linear speed of the medium at any track and the physical positioning of the apparatus track. The constant linear speed allows the processor to compute, once it begins receiving charging current (or stops receiving), the time required to cover the known distance to the LCD reflector. At this point, the processor can control the LCD display to be reflective or not. Thus, laser beam 309 passes through the LCD and is reflected off of a reflective background when the LCD is controlled to be in a first state and absorbed and/or scattered by the LCD when the LCD is in a second state, e.g., opaque.

The reflective background can be integral with the LCD (reflective type LCD) or the reflective background can be in the recess rather than integral with the LCD (transmissive type LCD). The reflectivity of the LCD reflective background in either case should approximate the reflectivity of the aluminum or gold substrate used on the CD. For that reason, a transmissive type LCD might be preferred with a smooth substrate backing in the recess track. Thus, information can be programmably transmitted under control of the processor to sensor 307 in the optical head and thus the processor can communicate with the CD-controller.

The optical head picks up a number of informational bits for each revolution according the length of the LCD element, i.e., how many "bars" are included in the LCD. The black bars would scatter the coherent light so the read head does not detect a sufficiently strong return, while the transmissive or reflective bar will return light to the read head. A filter might be used to modify or improve the light transmission and scattering characteristics.

The LCD can be shut down after the head has passed over (by timing estimation) to save energy. Once the communication has been completed, the processor can sleep until the next charging cycle. It is advantageous that the processor incorporate as many power saving features as possible.

If an LED is used, which may require more power, instead of the laser light being reflected, the LED is activated or kept inactive by the processor. When the light sensor 307 in the optical head senses light from the LED, it will decode a first level (e.g. a "1") and when the LED is turned off by the processor, the light sensor 307 will decode a second level (e.g. a "0"). The LED must be constructed such that in the off state, the reflectivity is such as to ensure that the reflection of the laser light does not trigger the light sensor in the optical head to read the first level. The LED preferably should approximate the wavelength of the CD read laser. In another embodiment, a laser diode is utilized rather than the LED. The diode should emit a beam with a wavelength close to or exactly the wavelength of the read beam 309.

Alternatively, the LED(s) can be constructed to have a fixed pattern when off. For instance, the LED(s) can be constructed with a scattering or absorptive pattern on the lens so that in the off state it either is seen as off by read head 300 or the lenses scatter/reflect light in a fixed pattern. The LED(s) in the ON state will modify the fixed pattern seen by the read head.

While the exemplary embodiments discussed herein utilize an LCD, LED or a laser diode, any material or device which can be electrically controlled by the processor to produce a different reflectivity or a different transmission of light sufficient to be distinguished by the light sensor in the optical head may be suitable for the present invention.

In another embodiment, the CD can receive as well as transmit data. In such an embodiment, the laser beam 309 in the optical head must be controllable to selectively provide light to a light sensor or charging array on the CD. In one embodiment, the read light can toggle off and on (perhaps a power save feature when the drive is not in use). In the case of a CD-writer, information can be written using the laser head at low power or possibly at high power if the materials can withstand the energy. When the laser beam can be toggled on and off, once charging is completed, the charging array can be utilized as an input medium. As the laser beam 309 illuminates the charging array, toggling it on and off can provide the informational signal required. The informational signal can be retrieved by timing the existence of charging current coming from the charging array. Due to physical material limitations, a much lower data rate is expected compared to normal CD data transfer rates. In addition, charging can easily continue while receiving data.

Alternatively, a light sensor(s) could be included in the apparatus track and read by the processor after each pass of the optical head. Note that the laser does not necessarily have to be turned off but the laser beam could be adjusted (e.g. by adjusting the mirrors in the optical head) so the laser beam does not impact the sensor on the CD during a specified time. Even a single light sensor on the CD could be utilized which of course would then require multiple rotations to provide the needed information.

Several exemplary uses of the processor can be considered here. One such example is for the processor to have a fixed key. Thus, the processor can have fixed coding as a write-only device that is laser programmed or is programmed during manufacturing with a fixed data sequence. It simply transmits this fixed coding repeatedly to the optical head every time it is accessed. That fixed coding can be a decryption key for software or a validation key without which the software will not run. It can be a decoding key or filter key for music. The CD cannot be duplicated in normal fashion as the copy will not have the hardware required to deliver this key.

In another example, the processor can have a counter and EEPROM, and increments the counter each time the apparatus track is read. The vendor's software can access the apparatus track each time the program is run, several times during running, once a day, once a week, or some other scheme. After a predetermined number of cycles has occurred, the processor simply transmits an "exhausted" code, and the CD is no longer usable. Alternatively, it transmits a unique serial code each time based on some starting point, and the vendor's software knows what the sequence is.

If the CD can receive information, the date can be written to the CD. The processor can be programmed to stop supplying a needed key after a certain date. Alternatively, the smart CD can make the data on the CD accessible after a certain date. For instance, a publishing company might choose to restrict current information to subscribers yet make old information partially or completely available.

The intent is not to describe all the possible uses to which this apparatus can be put. Suffice it to say that the apparatus of the present invention provides a smart CD which can be used with a standard CD-ROM or music CD. The smart CD provides even more possibilities with some small modifications to support pulsing the read light.

The preceding discussion generally assumes that the processor will lose power eventually and cannot retain sufficient charge between uses. In order to keep accurate timing information on the CD, e.g., a date, a thin-film battery may be utilized in the apparatus track to retain memory and timing circuits in the processor so that time-based information can be retained on the CD. Further, such a battery can provide sufficient power for the battery to continuously operate, at least in a power conservation mode. The battery could also provide power to the transmission element. A charging array could be utilized as a supplemental source of power or to recharge the battery. The length of time that the data and timing circuits could be kept alive heavily influences the possible uses. Even if the timing circuit can be kept active for only several months, that would be suitable for quarterly updates.

Figure 4:
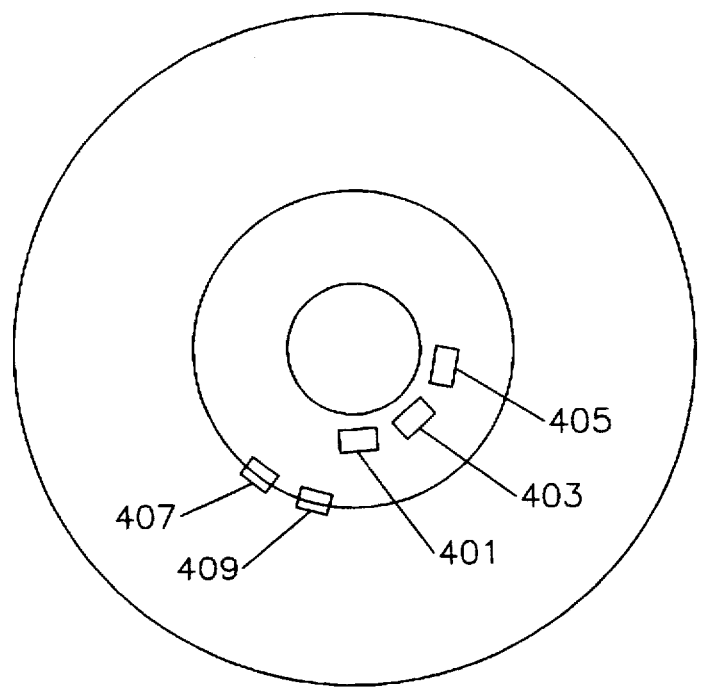
FIG. 4 shows the processor and battery in the hub area with the transmission element and light sensor arrayed along a portion of the CD track.

Referring to FIG. 4, an embodiment utilizing a battery for a power source is shown in which the charging array is not needed. Battery 401, processor 403 and memory 405 could be located outside of the data area while the transmission element 407 (e.g., the LCD) and an appropriate light sensor 409, could be located in a position in the hub or data track easily accessible by the optical head. Appropriate connections would of course have to be made between the elements. Further, it is necessary to notify and/or wake up the processor when light sensor 409 first receives energy from the laser beam which provides for initiation of communication.

While the invention has been described with reference to various embodiments, it will be understood that these embodiments are illustrative and that the scope of the invention is not limited to them. Many variations, modifications, additions and improvements of the embodiments described herein are possible.

What is claimed is:

1. An apparatus comprising:
a compact disk including an optically readable data area;
a processor disposed on the compact disk;
a charging array disposed radially around the compact disk;
a storage array, the storage array coupled to the charging array and storing charge received from the charging array, the storage array coupled to the processor for supplying power to the processor; and
a transmission element disposed on the compact disk and coupled to the processor, the transmission element being controllably coupled to the processor to controllably permit light to be reflected through said transmission element, thereby imparting an informational signal to an optical sensor.

2. An apparatus comprising:
a compact disk including an optically readable data area;
a processor disposed on the compact disk;
a transmission element disposed on the compact disk, the transmission element illuminated by laser light from an optical head, the transmission element controllably reflecting laser light to a light sensor, and wherein
the transmission element is coupled to and controlled by the processor to impart an informational signal to an optical sensor in the optical head.

3. The apparatus as recited in claim 2 wherein the transmission element is an LCD.

4. An apparatus comprising:
a compact disk including an optically readable data area;
a processor disposed on the compact disk;
a transmission element disposed on the compact disk and coupled to and controlled by the processor, the transmission element transmitting light to a light sensor in a read head to impart an informational signal to the light sensor.

5. The apparatus as recited in claim 4 wherein the transmission element is one of an LED and a laser diode.

6. The apparatus as recited in claim 4, wherein the transmission element is controlled to impart an information signal to the light sensor.

7. The apparatus as recited in claim 4, wherein the transmission element is controlled to prevent a read head from reading a predetermined pattern.

8. The apparatus as recited in claim 1, wherein the storage array, the processor and the transmission element are distributed radially around the compact disk.

9. The apparatus as recited in claim 8, wherein the charging array and transmission element are distributed in one of an innermost track and an outermost track.

10. The apparatus as recited in claim 2 further comprising:
an electrically readable memory element disposed on the compact disk and coupled to the processor.

11. The apparatus as recited in claim 2 further comprising a battery disposed on the compact disk for providing power to the processor.

12. The apparatus as recited in claim 2 further comprising:
a photosensor disposed on the compact disk to receive a light signal imparting information, the photosensor being coupled to the processor and providing the information to the processor.

13. The apparatus as recited in claim 1 further comprising:
a circuit coupled to the charging array to time a current on and off state to thereby detect an information signal when the charging array is illuminated with an information containing light signal, the circuit providing the information to the processor.

14. The apparatus as recited in claim 2 wherein the informational signal is one of a decryption key and a filter key.

15. A computer system comprising:
a compact disk read circuit;
a compact disk including an optically readable data area, readable by the compact disk read circuit;
a processor disposed on the compact disk; and
a transmission element on the compact disk, for imparting an informational signal to the compact disk read circuit which is readable by the compact disk read circuit, the transmission element being coupled to and controlled by the processor.

16. The apparatus as recited in claim 15 further comprising:
a light sensitive array receiving light from the compact disk reader circuit and generating a current in response to the light; and wherein
the compact disk reader circuit includes control circuitry to controllably provide light to the light sensitive array to thereby impart an informational signal to the light sensitive array; and
a circuit coupled to the light sensitive array to time an off and on state of the current to detect the informational signal from the compact disk reader circuit.

17. A method of communicating between a compact disk and a compact disk read head, the compact disk including a processor and a transmission element under control of the processor, the method comprising the steps of:
illuminating a photosensitive array disposed on the compact disk as a charging array to generate a current in the charging array;
providing the current to a storage element;
supplying the processor with power from the storage element; and
controlling a transmission element electrically coupled to the processor and optically coupled to the compact disk read head to impart an informational signal to the compact disk read head.

18. The method as recited in claim 17 wherein the transmission element is one of an LED, a laser diode, and an LCD.

19. The method as recited in claim 18 further comprising the steps of:
controllably illuminating the photosensitive array to impart an informational signal to the photosensitive array;
determining the informational signal provided to the photosensitive array; and
providing the informational signal to the processor.

20. The method as recited in claim 19 wherein the informational signal is a date.

21. The method as recited in claim 20 wherein the processor stops supplying needed information after the date, causing the compact disk to become unreadable.

22. The method as recited in claim 20 wherein the processor makes data on the compact disk available after the date.

23. A method of communicating between a compact disk and a compact disk reader, the compact disk including a processor and a transmission element coupled to the processor, the method comprising:

controlling the transmission element which is electrically coupled to the processor and optically coupled to the compact disk reader, to impart a read informational signal to the compact disk reader.

24. The method as recited in claim 23 wherein the transmission element is one of an LED, laser diode and an LCD.

25. The method as recited in claim 23 further comprising the steps of:

the compact disk reader providing light to a photosensitive array disposed on the compact disk to impart a write information signal to the photosensitive array;

determining a binary representation of the write information signal provided to the photosensitive array and providing the binary representation to the processor.

26. The method as recited in claim 23 further comprising the step of storing the binary representation in a memory location disposed on the compact disk, the memory location being accessible by the processor.

27. The method as recited in claim 23 wherein the processor counts each time the compact disk reader communicates with the processor via the transmission element and stores the count in nonvolatile memory, preventing access to the compact disk after the count reaches a predetermined value.

28. A method of communicating between a compact disk including a processor and a transmission element coupled to the processor and a compact disk reader, comprising the step of:

controlling a transmission element electrically coupled to the processor and optically coupled to the compact disk reader, the transmission element imparting an informational signal to the compact disk reader, to prevent the compact disk reader from accurately reading a predetermined pattern from the compact disk.

\* \* \* \* \*

UNITED STATES PATENT AND TRADEMARK OFFICE
CERTIFICATE OF CORRECTION

PATENT NO.    :   5,790,489
ISSUE DATE    :   August 4, 1998
INVENTOR(S)   :   O'Connor, Clint H.

It is certified that error appears in the above-identified patent and that said Letters Patent is hereby corrected as shown below:

Column 7, lines 37 and 38; please delete "to impart an informational signal to the light sensor", Column 8, line 50; please delete "informational", Column 8, line 65; please delete; please delete "and a compact disk reader; the compact disk", *and*

Column 8, line 67; please delete "the method comprising" and insert after the word "processor" --and a compact disk reader, the compact disk including a processor and a transmission element coupled to the processor, the method of comprising of:--.

Column 8, line 50, "an should be --a--.

Signed and Sealed this

Twenty-eighth Day of September, 1999

*Attest:*

Q. TODD DICKINSON

*Attesting Officer*        *Acting Commissioner of Patents and Trademarks*